United States Patent [19]

Yonko

[11] 4,204,111
[45] May 20, 1980

[54] HEATING IMPROVEMENTS IN A PREFORM REHEAT SYSTEM

[75] Inventor: Jon D. Yonko, Dayton, Ohio

[73] Assignee: Monsanto Company, St. Louis, Mo.

[21] Appl. No.: 843,565

[22] Filed: Oct. 19, 1977

[51] Int. Cl.² .................. H05B 1/00; F27B 9/06; B29C 17/07

[52] U.S. Cl. .................. 219/411; 219/349; 219/350; 219/388; 425/526

[58] Field of Search ............ 219/348, 349, 352, 405, 219/388, 351, 352, 411, 347, 354; 264/25, 329, 345; 432/121, 122, 124, 239; 34/4, 6, 39, 105; 425/526, DIG. 13, DIG. 38; 13/20, 22

[56] References Cited

U.S. PATENT DOCUMENTS

| | | | |
|---|---|---|---|
| 1,479,819 | 1/1924 | Klueuer | 219/347 |
| 2,387,804 | 10/1945 | Miskella | 219/347 |
| 2,497,676 | 2/1950 | Lashells | 219/354 |
| 3,217,139 | 11/1965 | Barber | 219/347 |
| 3,715,109 | 2/1973 | Gilbert | 432/122 |
| 3,741,044 | 5/1976 | Goltsos | 99/393 |
| 3,894,835 | 7/1975 | Berggren et al. | 432/124 |
| 3,950,459 | 4/1976 | Seefluth | 264/25 |
| 3,975,618 | 8/1976 | Goos et al. | 219/388 |
| 3,995,990 | 12/1976 | Dwyer et al. | 432/121 |
| 4,072,456 | 2/1978 | Appel et al. | 425/526 |
| 4,079,104 | 3/1978 | Dickson et al. | 219/377 |

FOREIGN PATENT DOCUMENTS

| | | | |
|---|---|---|---|
| 2610483 | 9/1976 | Fed. Rep. of Germany | 264/94 |
| 1162390 | 9/1958 | France | 219/354 |

*Primary Examiner*—Bruce A. Reynolds
*Assistant Examiner*—Bernard Roskoski
*Attorney, Agent, or Firm*—Michael J. Murphy

[57] ABSTRACT

In the process of raising elongated thermoplastic preforms to molding temperature by programming heat from vertically adjacent heaters at different temperatures into vertical zones of rotating preforms advancing before the heaters, the improvement of preventing heat waves emanating from one heater toward an oppositely disposed preform zone from overlapping into an area through which waves are issuing from the next adjacent heater. The apparatus includes blind members between immediately adjacent heaters extending toward the preforms to concentrate heat onto the oppositely disposed preform zone.

13 Claims, 2 Drawing Figures

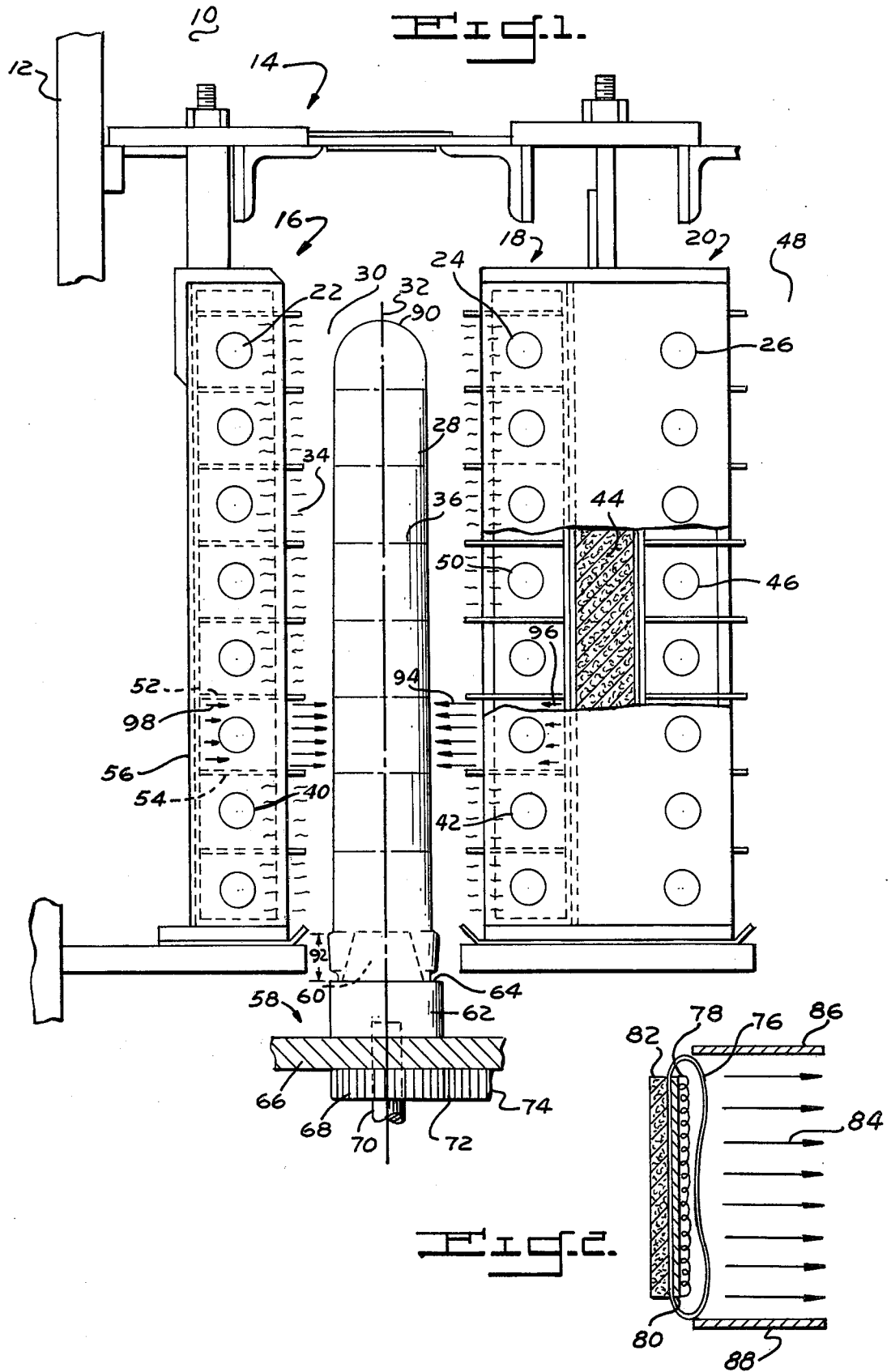

HEATING IMPROVEMENTS IN A PREFORM REHEAT SYSTEM

BACKGROUND OF THE INVENTION

This invention relates to heating thermoplastic preforms to molding temperature and more particularly to heat programming improvements applicable to such heating.

It is known to heat thermoplastic preforms to molding temperature prior to distension (for example axially and circumferentially) in a mold cavity into hollow article configurations. With some thermoplastics it is necessary to control the temperature of the material quite precisely since melt strength varies appreciably over a relatively narrow temperature range, especially around the molecular orientation temperature of the material. To accomplish such control and affect material distribution in the finished article, selective programming of heat into particular portions of the preforms has been practiced. Thus, systems are known wherein banks of vertically arranged resistance heaters are used to bring previously formed preforms to molecular orientation temperature. When such systems were used with certain thermoplastics sensitive to heat, for example the high nitrile materials, a phenomenon known as "banding" occurred in that optically unattractive thickness variations around circumferentially extending portions of the finished article were apparent to the naked eye. This was believed caused by uneven heating of the preform by individual heaters in that input to a particular short vertical zone of influence of the preform from an opposite heater tended to be greater toward the middle of such zone than toward its ends with the result that the middle during molding stretched more than the ends to produce the uneven wall and the visual banding effect.

To improve control and avoid such heat concentration, in one case individual heaters of an opposing pair were staggered or offset vertically from one another to a horizontally non-aligned disposition whereas in another case such heaters were tilted along their length from the horizontal in the direction of advancing preform movement. However, each of these approaches detracted from the ability to closely control the evenness of heating in each vertical zone of the preform by a particular heater or heater pair in that the effect of adjacent heaters preset at different temperatures overlapped opposing adjacent zones of the preform, when in fact it is desired that each preform zone be influenced by a single heater or opposing heater pair.

SUMMARY OF THE INVENTION

Now, however, process and apparatus improvements have been developed for heating preforms to molding temperature which overcome the aforementioned and other prior art difficulties.

Accordingly, a principal object of this invention is to provide improvements in controlled heating of preforms of thermoplastic material to molding temperature.

Another object is to provide such improvements which are particularly applicable to materials having strength properties which are sensitive to temperature change in that they vary widely over relatively narrow molding temperature ranges.

A further object is to provide such improvements in controlled heating which avoid banding in the finished formed articles.

An additional object is to provide such improvements which promote uniform heating of vertical zones of preforms via heaters at temperatures specifically preset to influence predetermined preform zones without any significant overlapping adjacent zones.

Yet a further object is to provide means to carry out the aforementioned objects.

Other objects will in part be obvious and will in part appear from the following description and claims.

These and other objects are accomplished in the process of raising elongated thermoplastic preforms to molding temperature which includes programming heat from vertically adjacent heaters at different temperatures into predetermined vertical zones of advancing preforms rotating about their axes, by providing the improvement therein comprising preventing heat waves emanating from one heater toward an oppositely disposed zone of a preform from overlapping into an area through which waves are issuing from a next adjacent heater.

From an apparatus standpoint, there is provided in an oven for raising elongated thermoplastic preforms to molding temperature which includes vertically adjacent resistance heaters at different temperatures and means advancing the preforms through the oven before the heaters while rotating about their axes, the improvement wherein each heater is positioned substantially normal to the axes of the preforms, and including, in combination, blind means between immediately adjacent heaters extending toward the preforms for concentrating heat emanating from each such heater onto an oppositely disposed zone of each preform.

BRIEF DESCRIPTION OF THE DRAWING

In describing the overall invention, reference will be made to the accompanying drawing wherein:

FIG. 1 is a vertical, schematic, partially sectioned view of an apparatus embodiment according to the invention; and FIG. 2 is a veiw similar to FIG. 1 of an alternate form of heater operable in the invention.

DETAILED DESCRIPTION OF ILLUSTRATED EMBODIMENTS

Referring now to the drawing, the outline of a heat treating chamber in the form of an oven 10 is shown in FIG. 1, having sides 12 in a vertical plane supporting horizontal structural members 14 holding opposing banks 16, 18, of vertically adjacent resistance heaters upright, the uppermost heaters of which are typically identified as 22, 24. Such heaters function to raise the temperature of elongated thermoplastic preforms 28 to molding temperature prior to stretching longitudinally and circumferentially by a suitable blowing medium in the cavity of a downstream mold, not shown. Stretch-blow means for accomplishing such distension are known in the art with one typically depicted in FIG. 6 of U.S. Pat. No. 3,830,893.

Heater banks 16 and 18 extend in the oven direction, i.e. perpendicular to the plane of FIG. 1, and each pair of opposing banks defines a channel 30 through which preforms sequentially advance seriatim while being heat treated. One channel 30 is depicted in elevation in FIG. 1, however it should be realized that a plurality of horizontally adjacent channels are usually employed in commercial systems to simultaneously treat advancing rows of such preforms, with closed ends, when provided, either above or below the open ends. In this last respect, one bank 20 of a next adjacent bank pair is shown in FIG. 1 with 26 representing the uppermost heater therein. Though only heaters 22, 24 and 26 are exemplarily identified, the remaining heaters in each vertical row are all preferably similar in construction. Each heater 22, 24 and 26 is rod-like in profile shape, is circular in cross section and capable of radiating heat from its surface in all directions, i.e. through 360 degrees. Each heater extends normal to the axes 32 of the preforms to insure that heat emanating from it is successively absorbed into the same portion of the preform as the latter advances through the oven before that particular heater. The heaters are of the electrical resistance type and are conventionally operatively connected to suitable sources of power utilizing conventional controllers, switches and the like as necessary and not shown herein. For maxiumum control a single controller is preferably used for each opposing heater pair 22, 24.

In accordance with the invention, reflecting means circumscribe three sides of each heater with a fourth side 34 facing the preforms being open and unobstructed to permit concentrating radiant heat waves issuing from each heater onto a predetermined, oppositely interposed, circumferentially extending zone of each preform 28. In the illustrated embodiment, from a process standpoint the preforms are considered to be vertically divided into eight zones in direct alignment with and intermediate a pair of opposite, horizontally aligned heaters, the latter being evenly spaced from each other in the vertical direction, though such spacing need not necessarily be identical with alternate system geometries. Though the number of heaters in each bank may vary from the eight shown, the quantity, which is directly proportional to the number of zones into which the preform is arbitrarily divided, will usually range between 3 to 10 when the hollow articles being formed in the downstream mold are commercial-sized containers of from about 6 to 96 ounces nominal capacity. The number of heaters and associated preform zones are dependent on cost and the extent of temperature control desired in the preform. If the number is too few, close control over stretch in the downstream mold is sacrificed whereas if the number is great capital and energy costs are high.

Each heater in each bank 16, 18 of an opposing bank pair (for example 40 and 42, in FIG. 1) is preferably horizontally aligned opposite another heater being maintained at substantially the same temperature in order to provide uniformity of exposure of the particular preform zone being treated to constant temperature heat. It should be realized, though, that for assymmetrical preform and/or end article configurations it may be desirable to have one heater of an opposing pair set at a somewhat different temperature than the opposite one in the opposing bank. Also, though the number of channels may vary, when a plurality of at least two are used insulating means 44 is preferably provided between back to back, immediately adjacent banks 18, 20 which define adjacent, different channels, such means serving to thermally insulate and minimize the effect of a heater in one bank on those in the adjoining one. For example, because of slightly different local ambient conditions in oven 10 it may be desirable to have heater 46 of channel 48 in FIG. 1 set at a somewhat different temperature than that of heater 50 treating preforms in channel 30.

The reflecting means of the invention in a broad sense comprise flat, horizontally disposed blinds preferably in the form of rigid plates 52, 54 extending along the length of oven 10 and positioned parallel to the lengthwise axis of and above and below the axis of each heater a distance on the order of 1.3 cm. With the heaters of FIG. 1 an additional vertically disposed reflector plate 56, which may be of one-piece construction for a particular bank, is positioned normal to the lengthwise axis of and behind each heater a distance from such axis on the order of 2.3 cm. Plate 56 acts to diffuse heat emanating from the back side of a heater away from the preform back toward the particular preform zone being treated by that heater as exemplified by arrows 96, 98. With respect to the lateral planar distance from the ends of horizontally disposed reflectors 52, 54 closest to the preforms to the adjacent vertical walls thereof, if such distance is too short placing such reflector ends real close to the preform wall, it is felt that banding could occur in the finished container or a blanking out of the surface to sufficient heat in areas substantially opposite the vertical thickness of the reflectors, whereas if such distance is too great the desired degree of control by the individual heaters over the particular preform zones cannot be achieved. Distances between about 0.6 to 2.1 cm. are believed suitable for most applications when the aforementioned parameters are kept in mind.

During movement through oven 10, preforms 28 are rotated about their vertical axes 32 by a suitable means exemplarily identified as 58. Means 58 comprises frusto-conical plug 60 dimensioned for insertion within an open end of preform 28, and secured with cylindrical member 62 of greater diameter to permit the top face of the preform to rest on its upper surface 64. Members 62 and 64 are rotably supported on horizontally extending carrier plate 66 mounted for advancement through oven 10 by a suitable means such as endless conveying chains, not shown, to which it is secured at either end. Rotation of each preform is accomplished via a pinion gear 68 mounted on a stub shaft 70 operatively connected to member 62. Thus, as plate 66 advances through oven 10 the teeth of gear 68 intermeshing with teeth 72 of operatively adjacent ratchet 74 cause support 62 and therefore preform 28 seated upright thereon to rotate.

With respect to FIG. 2, an alternate embodiment of heater design is illustrated which may be employed with or in place of those shown in FIG. 1 and comprises a concave inward envelope sheathing 76 enclosing resistance wiring 78 suitably connected to a power source and carried on a support 80 associated with conventional mica insulator plate 82. With this embodiment, heat is directed forwardly only as exemplified by arrows 84 and therefore a rear reflector plate is unnecessary, only blinds 86 and 88 being required to avoid influence of the heater on the next adjacent preform zone.

In operation, molded elongated preforms 28 are provided to oven 10, each preform having a generally symmetrical contour about lengthwise axis 32 and preferably having a closed end 90 of hemispherical configuration and an annular finish portion 92 surrounding an opposite open end. Preforms 28 may be formed of any thermoplastic material but the invention is particularly applicable to heat sensitive thermoplastics such as those comprising a major poriton (i.e. at least 50 weight percent) of a polymerized nitrile-group-containing monomer. Such monomers typically constitute acrylonitrile, methacrylonitrile and mixtures thereof with one or more copolymerizable monomers such as styrene and the like. Preforms 28 have been previously molded by conventional techniques such as injection or blow molding, or by extruding tubing followed by severing into individual lengths, or by thermoforming from sheet material, and are to be increased from substantially room temperature to a molding temperature which is preferably within the molecular orientation temperature range of the particular thermoplastic material. Somewhat higher molding temperatures can be provided in the material if molecular orientation is not desired and suitable supports extending well into the preforms are used against collapse before remolding. Preforms 28 are loaded either manually or mechanically over plug 60 onto member 62 and advanced while rotating, preferably single file, along channel 30 between opposing banks 16, 18 of heaters positioned to treat eight one inch vertical zones in each preform into which radiant heat will be individually programmed. With thermoplastics not particularly sensitive in strength to temperature in the molding region it may be desirable to pass plural side by side preforms along a channel at once. Finish portion 92 in FIG. 1 has been final-formed in the preform molding step and since it is not to be reshaped in the downstream mold it is positioned below the lowermost heaters in the banks and therefore beyond the influence thereof. In this respect the lowermost canted blind in FIG. 1 to some extent serves to shield such finish from the bottom pair of heaters in the banks. Though specific settings for the heaters will be determined by the nature of the thermoplastic material and the extent and rate of stretch of the particualr zones of the preforms as determined by the preform configuration per se and that of the hollow article into which it will be remolded downstream, each opposing heater pair for most configurations is usually set at somewhat different temperatures from that of the other pairs, and, for a 70/30 weight percent polymer of acrylonitrile/styrene typically range between 327° to 424° F. to provide a temperature in the plastic of between about 132° to 138° F.

As preforms 28 advance along channel 30 heat is radiated from each pair of oppositely disposed, horizontally aligned heater banks 16, 18 and, in accordance with the invention, heat waves emanating from one heater toward an opposite, rotating preform zone are affirmatively substantially prevented by blind member pairs such as 52, 54 from overlapping into an area through which are issuing waves from the next immediately adjacent heaters. Such prevention is accomplished by reflecting heat waves issuing toward the next adjacent zone from the heater surface back into the particular zone which that heater is intended to affect. Further, with the embodiment of FIG. 1, wherein heat is radiated in all directions, rear reflectors 66 direct waves issuing in the opposite direction away from the preform back toward the appropriate preform zone, whereas, as previously mentioned, reflectors 66 are unnecessary with the heater configuration of FIG. 2.

With the particular reflecting means of the invention, the lines of heat flux eventually absorbed by the thermoplastic material of the opposite zones of the preforms are relatively even and constant as exemplified by the set of arrows identified at 94 in FIG. 1, arrows 96, 98 signifying heat waves deflected from a rear reflector plate portion such as 56. In comparison, it is considered that in the absence of any reflector plates at all around the heaters, the lines of heat flux are more uneven and are greater toward the center of a particular zone in comparison with those toward the ends of such zones. This latter unevenness provides the uneven temperature within the preform zone which causes the uneven stretching and banding problems which the invention overcomes.

The above description and particularly the drawing are set forth for purposes of illustration only and are not to be taken in a limited sense. Various modifications and alterations will be readily suggested to persons skilled in the art. It is intended, therefore, that the foregoing be considered as exemplary only and that the scope of the invention be ascertained from the following claims.

What is claimed is:

1. In the process of raising elongated thermoplastic preforms to molding temperature which includes programming heat into predetermined vertical zones of advancing preforms rotating about their axes from vertically adjacent heaters at different temperatures extending longitudinally of such axes, the improvement therein comprising, in combination:
preventing heat waves emanating from one heater toward an oppositely disposed zone of a preform from overlapping into an area through which waves are issuing from a next adjacent heater; and
reflecting heat waves emitted from the back sides of a pair of directly oppositely disposed heaters away from the preform zone interposed between said pair back toward such just-mentioned zone through use of vertically disposed reflectors situated adjacent the back sides of said pair.

2. The process of claim 1 wherein said step of preventing is accomplished by reflecting the heat waves with blinds between immediately adjacent heaters.

3. The process of claim 1 wherein such programming is accomplished by radiating heat from oppositely disposed banks of such heaters into preforms sequentially advancing seriatim between such banks.

4. The process of claim 1 wherein the thermoplastic comprises a major portion of a polymerized nitrile-group-containing monomer.

5. The process of claim 4 wherein the thermoplastic is raised to within the molecular orientation temperature of the material.

6. The process of claim 5 wherein the thermoplastic material comprises a major portion of a nitrile-group-containing monomer.

7. In an oven for raising elongated thermoplastic preforms to molding temperature which includes vertically adjacent resistance heaters at different temperatures arranged in vertical banks horizontally adjacent each other forming channels for such preforms and means advancing the preforms along the channels before the heaters while rotating about their longitudinal axes, the improvement wherein:
each such heater is positioned substantially normal to the axes of the preforms, and including, in combination,
blind means between each immediately adjacent heater extending toward the preforms for concentrating heat emanating from each such heater onto an oppositely disposed zone of each preform; and
insulating means between immediately adjacent banks.

8. The apparatus of claim 7 including a reflector behind each such heater.

9. The apparatus of claim 7 wherein the heaters are curvilinear in cross section and are capable of radiating heat through 360 degrees.

10. In an oven raising elongated thermoplastic preforms to molding temperature having opposing banks of vertically adjacent resistance heaters at different temperatures radiating heat to the preforms as they pass single file therebetween while rotating about their axes, the improvement wherein:

each such heater is rod-like in shape, radiates heat in all directions and extends normal to the axis of the preforms; and including reflecting means behind and extending throughout the length of each such heater to concentrate heat on a predetermined, oppositely interposed, circumferentially extending zone of each rotating preform; and means between adjacent heaters to prevent heat waves emanating from a heater toward an oppositely disposed zone of a preform from overlapping into an area through which waves issue from a next adjacent heater.

11. The apparatus of claim 10 including vertical banks of said heaters horizontally adjacent each other forming channels for such preforms and insulating means between immediately adjacent bank pairs.

12. The apparatus of claim 10 wherein the number of vertically arranged heaters in each bank is between three to ten.

13. The apparatus of claim 10 wherein individual heaters at one temperature in each bank of a bank pair between which the preforms pass are horizontally aligned opposite other heaters at substantially the same temperature in the other bank of such pair.

* * * * *